United States Patent
Borland et al.

(10) Patent No.: US 6,246,756 B1
(45) Date of Patent: Jun. 12, 2001

(54) METHOD AND SYSTEM TO METER AND CONTROL USAGE OF TELEPHONE SYSTEMS

(75) Inventors: David J. Borland, Austin; Al Hartmann, Round Rock, both of TX (US)

(73) Assignee: Advanced Micro Devices, inc., Sunnyvale, CA (US)

(*) Notice: Subject to any disclaimer, the term of this patent is extended or adjusted under 35 U.S.C. 154(b) by 0 days.

(21) Appl. No.: 09/270,707

(22) Filed: Mar. 17, 1999

(51) Int. Cl.[7] .............................. H04M 1/56; H04M 3/00; H04M 1/66; H04M 1/00
(52) U.S. Cl. ....................... 379/142; 379/188; 379/194; 379/200; 379/352
(58) Field of Search ............................. 379/111, 112, 379/114, 130, 140, 142, 131, 132, 143, 144, 145, 153, 155, 168, 177, 182, 183, 184, 187, 189, 194, 195, 199, 188, 196, 200, 350, 352

(56) References Cited

U.S. PATENT DOCUMENTS

| | | | |
|---|---|---|---|
| 4,953,202 | * 8/1990 | Newell | 379/200 |
| 5,200,995 | * 4/1993 | Gaukel et al. | 379/200 |
| 5,444,764 | * 8/1995 | Galecki | 379/58 |
| 5,454,033 | * 9/1995 | Hahn et al. | 379/198 |
| 5,546,447 | * 8/1996 | Skarbo et al. | 379/142 |
| 5,655,013 | * 8/1997 | Gainsboro | 379/188 |
| 5,737,701 | * 4/1998 | Rosenthal et al. | 455/411 |
| 5,745,559 | * 4/1998 | Weir | 379/199 |
| 5,802,157 | * 9/1998 | Clarke et al. | 379/196 |
| 5,809,126 | * 9/1998 | Smith et al. | 379/200 |
| 5,852,653 | * 12/1998 | Reel et al. | 379/88 |
| 5,864,613 | * 1/1999 | Flood | 379/188 |
| 5,884,193 | * 3/1999 | Kaplan | 455/565 |
| 6,141,563 | * 10/2000 | Miller et al. | 455/558 |

* cited by examiner

*Primary Examiner*—Curtis Kuntz
*Assistant Examiner*—Binh K. Tieu
(74) *Attorney, Agent, or Firm*—Conley, Rose & Tayon PC; Jeffrey C. Hood

(57) ABSTRACT

A method and a system to meter and control the usage of a telephone. The metering and control functions are applicable for specific outgoing or incoming destination, the specific user of the telephone, the time of the day when an outgoing call is made or an incoming call is received, and the calling time allowed either collectively or per the specific outgoing or incoming destination. At least one list of a plurality of lists is stored. Each of the stored lists includes at least one entry, and each entry includes at least one of a plurality of fields. The fields within an entry contain information that is used by the metering circuitry to execute the control functions. The outgoing or incoming phone number is received and encoded using a codec unit and compared with all the entries stored within the lists. The result of the comparison is used to determine if a match exists between the encoded phone number and one of the entries stored within the lists. A request for a user identification code is made if a match is obtained. Subsequently, the information contained in the entry's fields is used to control the user access to use the telephone and to meter the user access when the latter is granted. If no match between the encoded phone number and one of the entries is found, or the identified user has access availability, the encoded phone number is decoded and the call is permitted.

43 Claims, 6 Drawing Sheets

191
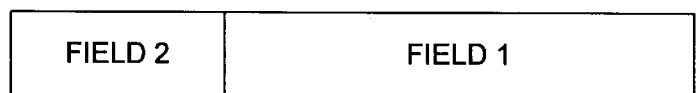
192
193
194
*FIG. 1A*
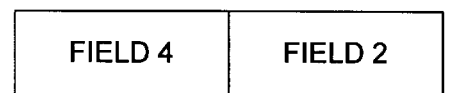
195

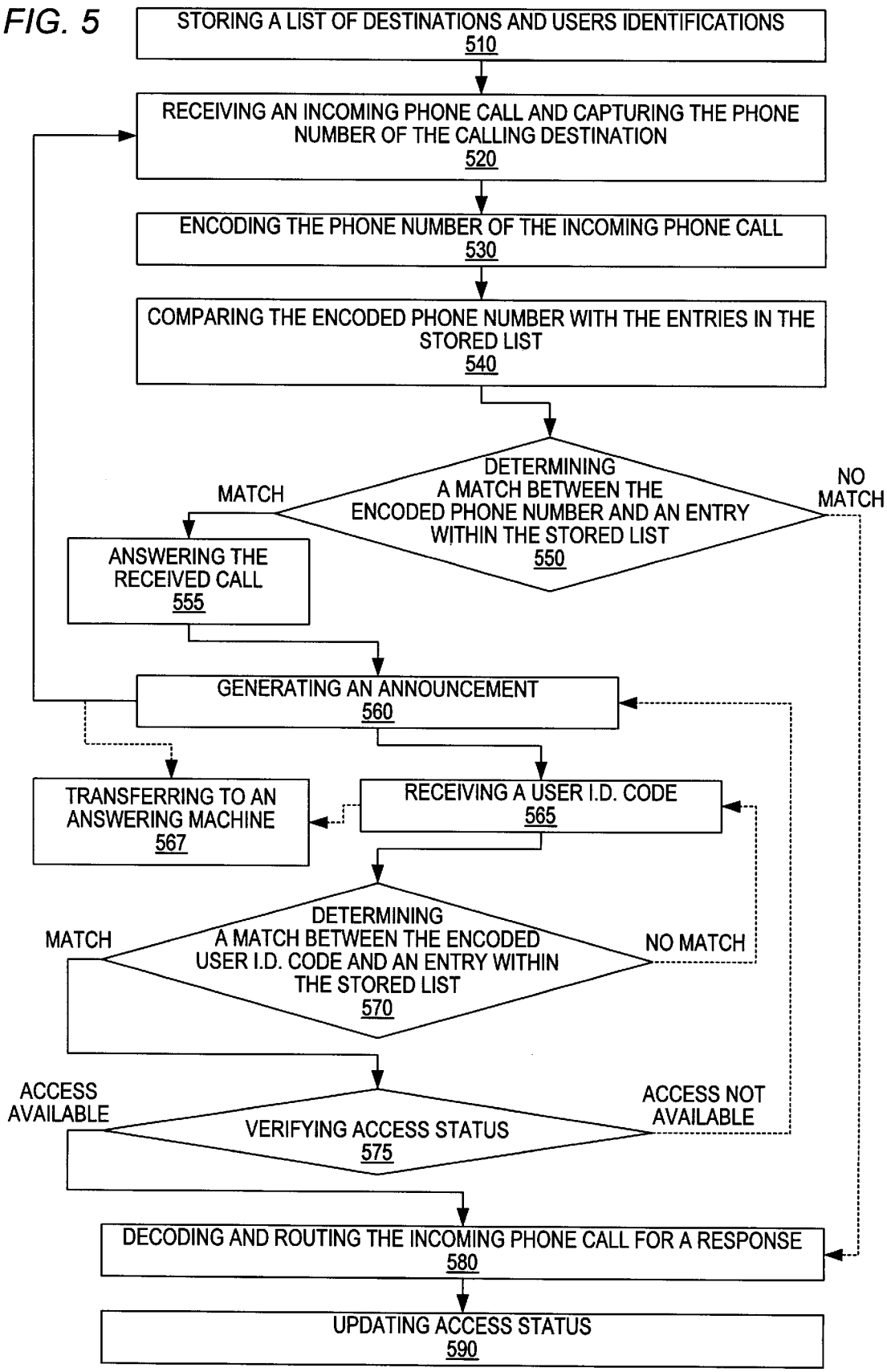

METHOD AND SYSTEM TO METER AND CONTROL USAGE OF TELEPHONE SYSTEMS

BACKGROUND OF THE INVENTION

1. Field of the Invention

The present invention relates generally to telephone systems, and more particularly to telephone systems with monitoring and control functions.

2. Description of the Relevant Art

The telephone is one sign of modem life. Since its invention, the telephone has seen a remarkable expansion in both usage and functionality. Today, the telephone is a necessity for every business and the majority of homes. The basic idea of a telephone system is simple. Changes in air pressure, or sound waves, are converted to electrical signals by a microphone. The electrical signals are transmitted via a communication path to a receiver. The receiver converts the transmitted signals back to sound.

Telephone systems have continuously become more complex due to the utilization of different technologies. These technologies have substantially increased the telephone systems usage and functionality. Loudspeakers have been added to provide hands free functions. Wireless technologies have been employed to provide wireless functions. Memories and processors have been used to provide many functions, such as speed dial, answering services, routing functions, and access control functions, among others. Many modem telephone systems employ some software programming and hardware adjustments to provide control functions and automation, such as operating lights, appliances, thermostats, motorized drapes, phones, and other devices.

Within home or office environments, the integration of wireless technologies into telephone systems has provided the cordless telephone. In the latter, a handset of the telephone system is remotely coupled to a base without using a cord. Communication is established between the base and the handset by transmitting and receiving electromagnetic waves. Since the frequency range of the human sound is relatively low, a carrier wave of a much higher frequency is modulated (based on the sound of the user) and transmitted by a transmitter to a receiver. The received modulated wave is decoded and the information carried by the wave is extracted. Cordless telephone systems may use a range of frequency to facilitate the communication between the base and the handset. Cordless telephones are designed for use within the boundaries of a building. The energy associated with the communication signal, between the base and the handset, allows the signal to propagate only for a limited distance.

As the development of telephone systems continues, many services associated with telephones are made available almost on everyday. With the vast increase in services that are available just by dialing phone numbers, a concern may arise about the time that is spent by an individual using the telephone. Concerns may also arise about the nature of a call that is placed by the individual, the type of the service that the individual is using, and the cost associated with the usage of the telephone. Unfortunately, some of the services that are easily available through the phone may not be appropriate for some users. For example, many of today services that utilize the 900 dialing structure may not be appropriate for young users. Some of these services are directed toward specific groups of the population, such as teenagers. Not only is using some of these services inappropriate, but also their usage may also result in costly telephone bills. Furthermore, parents may prefer that their children spend no time on the telephone (for some destinations) or a limited time while they talk with their friends. Children may neglect to manage their time properly and they may spend more time on the telephone than on other activities, such as doing their homework. Therefore, telephone systems that enable control, such as parental control, over their usage are desirable. Furthermore, telephone systems that enable metering their usage are also desirable.

SUMMARY OF THE INVENTION

The present invention comprises a telephone system that enables configurable metering of selected outgoing calls, where the metering is configurable by the owner of the system. The metering functions enable controls over the time spent on calls (collectively and per call) and the specific time when the call is made per the specific destination per the specific user. The telephone system comprises an entry device that is configured to dial phone numbers of destination stations, a transmitter that is configured to transmit the initiated outgoing call, and a metering circuitry that is coupled to the entry device and to the transmitter. The metering circuitry is used to examine and to meter the phone number of the outgoing call prior to transmission. The metering circuitry is configured to store at least one list of a plurality of lists; such that each list includes at least one entry that is indicative of a phone number of an outgoing call and/or a user. The metering circuitry receives a first series of dialing signals from the entry device that is entered by the user. The first series may include dialing signals for both the outgoing destination and an identification code for the user. The received first series is encoded into a corresponding code using an encoder/decoder (codec) unit within the metering circuitry. The corresponding code (or the encoded first series) is indicative of at least one of the phone number and the user. The metering circuitry compares the corresponding code with entries that are stored in the list. Each of the stored entries may comprise one of more fields containing information about the phone number of the outgoing destination, the user, the time of the day when the outgoing destination may be metered, and the overall time allowed for calling the outgoing destination.

The corresponding code is compared with one or more fields whereas the value of a clock time is verified with the time of day. The metering circuitry is configured to meter the user's usage of the telephone system if the corresponding code matches at least one entry that is stored in the list, based on a set of control actions that are established based on the content of the entry. The metering circuitry denies the user an access to use the telephone system if the user's usage of the telephone reaches specific parameters according to predetermined criteria. Furthermore, the metering unit is configured to route the outgoing call to the transmitter if the information contained in the encoded first series does not match any of the entries stored within the lists, thus permitting the outgoing call to be transmitted upon the communication line.

The present invention further contemplates a metering circuitry within the telephone system that comprises a card reader that is configured to read a card that is assigned to a user. The card reader is adapted to register an access identification code of the user. Further, the card reader may be configured to read pre-recorded information from the card such as the telephone usage time and to update such information according to the usage of the telephone by a cardholder or a user. The telephone system further comprises an access control unit, an announcement generator, and a selector. The access control unit is configured to enable storing of entries in the lists using an access code that is known by the owner. The announcement generator is configured to broadcast at least one of a plurality of announcements in response to various control actions that are performed by the metering circuitry. Different announcements may be broadcast based on the type of outgoing phone number dialed, the user, the time of the day, and the user's access status with respect to a specific destination or to the use of the telephone system. The selector is also configured to capture at least the phone number of an incoming call prior to forwarding the call for reception or during the reception of the incoming phone call. The metering circuitry is configured to use the captured information from the incoming phone call in manner similar to that of a dialed outgoing phone number through the entry device. Accordingly, the metering controls that are applicable on the usage of the telephone system for placing outgoing calls are also applicable for receiving incoming phone calls.

The present invention still further contemplates a method to meter and control the usage of a telephone for selected outgoing and incoming calls and for selected users. The method comprises storing a first list of a plurality of lists, wherein the first list includes at least one entry that is indicative of a phone number of the outgoing call and/or a user; receiving a first series of dialing signals that is entered by the user; encoding the first series into a first code, wherein the first code is indicative of at least one of the phone numbers and the users; metering the user's usage of the telephone if the first code matches at least one entry in the first list; and denying the user an access to use the telephone if a first parameter reaches a predetermined value, wherein the first parameter is indicative of said usage.

BRIEF DESCRIPTION OF THE DRAWINGS

Other objects and advantages of the present invention may become apparent upon reading the following detailed description and upon reference to the accompanying drawings in which:

FIG. 1A is an illustration of a plurality of structures of entries for various lists within the metering unit of the telephone system that enables metering of its usage;

FIGS. 5 is a flow chart of a method that enables metering of an individual usage of specific phone numbers and specific classes of phone numbers of with the option to perform the metering function upon incoming calls.

Figure 1:
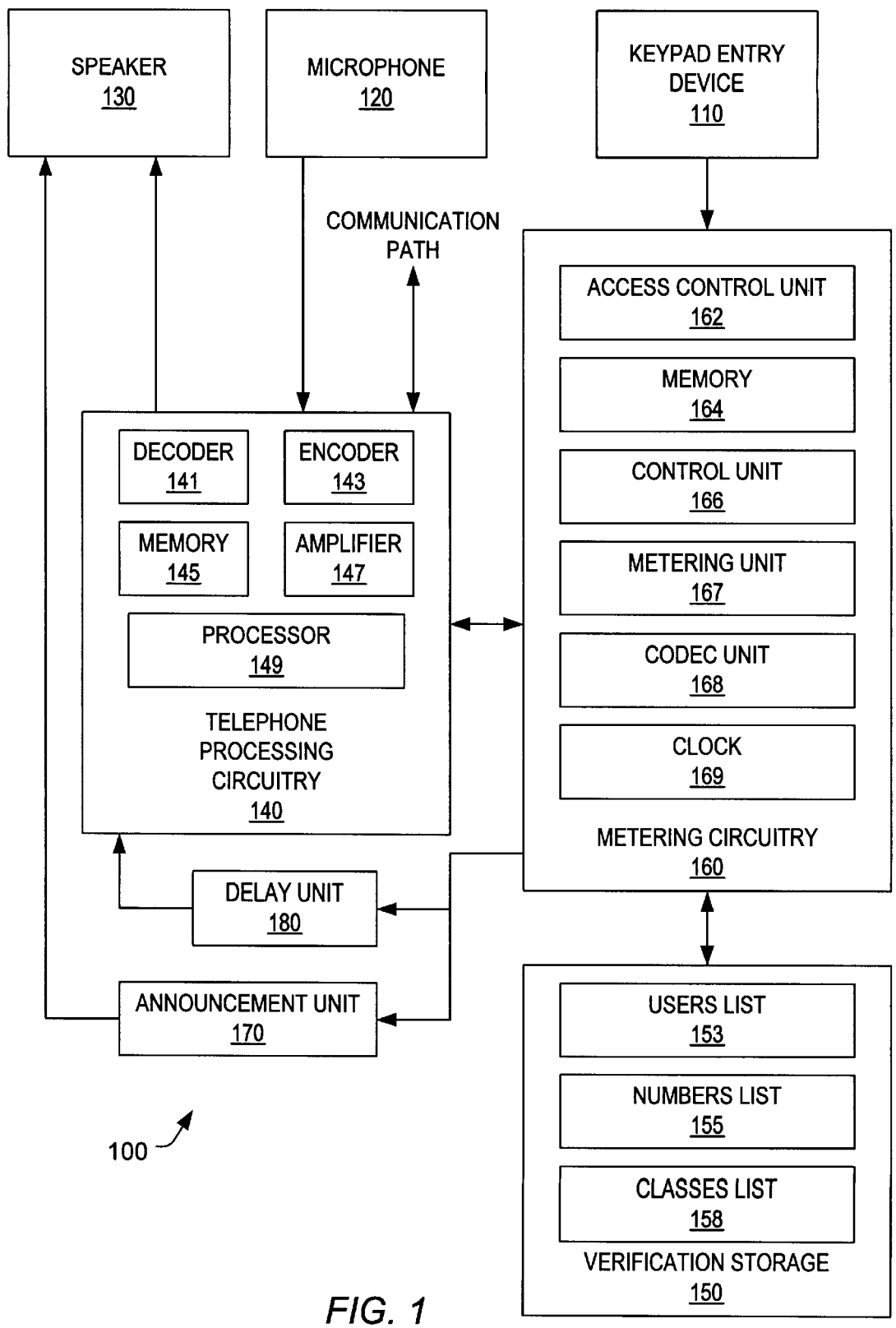
FIG. 1 is a block diagram of a telephone system that enables metering of an individual usage of specific phone numbers and specific classes of phone numbers of outgoing calls.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Turning now to FIGS. 1 and 1A, a block diagram of a telephone system is shown (in FIG. 1) that enables metering of an individual usage of specific phone numbers and specific classes of phone numbers of outgoing calls. The telephone system 100 includes a telephone processing circuitry 140 and a metering circuitry 160. It also includes speaker 130 and a microphone 120, which are coupled to the telephone processing circuitry 140. The latter includes a processor 149 that is configured to provide processing of signals which are related to receiving, addressing, and transmitting phone calls made from the telephone system 100 and those received by the telephone system 100. A decoder 141 may be configured to receive the incoming phone call from a phone line, whereby an encoder 143 may be configured to prepare the outgoing call for transmission upon the phone line. The incoming and/or outgoing phone calls, and the related processing signals, may be analog or digital. In one embodiment, a memory 145 (shown within the telephone processing circuitry 140) may be used to store phone numbers for different purposes, such as speed dialing functions. An amplifier 147 may be used to amplify signals at different stages, and for different purposes, such as to facilitate speakerphone functions.

In one embodiment, a keyboard entry device 110 is coupled to the metering circuitry 160 rather than the telephone processing circuitry 140. In this embodiment, the signal(s) generated by the keyboard entry device 110 (dialing signal) is transmitted to the metering circuitry 160. The latter includes an access control unit 162, a memory 164, a control unit 166, a metering unit 168, an encoder/decoder (codec) unit 168, and a clock 169. The metering circuitry 160 is coupled to a verification storage 150 that includes one or more lists.

In the embodiment of FIG. 1, three lists are shown. The first list is the users list 153, which contains entries that are indicative of users of the telephone system 100. Each entry in the users list 153 may be considered as a user identification code. The user identification codes are selected such that each user of the telephone system has a unique user identification code. The user may select the user identification code; however, the code must be approved and entered into the users list 153 by the owner of the telephone system 100 or by individuals who are authorized by the owner. The access control unit 162 of the metering circuitry 160 controls entering of the user identification codes. Accordingly, accessing the metering circuitry 160 through the access control unit 162 requires a special access code that is known by the owner of the telephone system 100.

The second list shown within the verification storage 150 is the numbers list 155. The numbers list 155 contains phone numbers of destinations that may be dialed through the keyboard entry device 110. The numbers list 155 contains phone numbers for destinations that are placed for monitoring by the owner of the telephone system 100. The monitoring of a destination that is identified in the numbers list 155 includes metering the time that the telephone system 100 is engaged in an active communication with the identified destination. For example, the numbers list 155 may contains entries representing seven-digit phone numbers (123-4567), ten-digit phone numbers (123-123-4567), eleven-digit phone numbers (1-123-123-4567), or other combinations of digits which represent destinations that may be dialed through the keyboard entry device 110. A digit within an entry, as used in this description, may be any of the numerical digits 0– 9. Additionally, the digit within an entry may also be a letter. Occasionally, it is customary to combine numerical and letter digits in reporting telephone numbers for convenience and advertisement purposes. Furthermore, it should be noted that the length of an entry within the numbers list 155 may be variable, and the owner of the telephone system 100 may select such length. However, the entries within the numbers list 155 are indicative of the full destination numbers or the full destination identifications.

The third list shown within the verification storage 150 is the classes list 158. This list contains classes of phone numbers for destinations that may be dialed by the keyboard entry device 110. A class of phone numbers may be an area code (for example: 512, 850, or 904), a special code (for example: 900 or 888), or any combination of numbers that are selected by the user of the telephone system 100 (for example: 888123, 001,47). In general, the class of the phone number is a part of the digits representing the destination phone number. The class of the phone number is indicative of the type of the dialed destination. For example, the class 900 may identify all destinations that have 900 in their phone numbers (within first three or four digits). The class 900 may be stored as en entry within the classes list 158. Accordingly, the need to store all the 900 phone numbers of concern in the numbers list 155 is eliminated, and the dialed 900 destinations may be identified by the class 900 stored within the classes list 158.

The user of the telephone system 100 may enter the plurality of the lists (which contains identification entries of destinations to be monitored), that are stored in the verification storage 150, using other methods in addition to entering destinations numbers through keyboard entry device 110. For example, the lists may be downloaded from a computer or other external media storage. The verification storage 150 may be an external or internal device with respect to the metering circuitry 160. Accordingly, the verification storage 150 may be any storage medium that enables holding of an identification of a phone number, a class of numbers, or a user; such that the phone number, the class of the phone numbers, or the user information is recoverable by the metering circuitry unit 160 upon request.

In general, each stored list contains information about phone numbers or classes of phone numbers. Therefore, information stored in the verification storage 150 may be the phone numbers themselves, other identification information that is indicative of the phone numbers or the corresponding destinations, and identification information that is indicative of the users. For example, the phone number of a destination to be metered "A" in the form of touch-tone series may be stored in the numbers list 155. Alternatively, one or more forms of identification information that is unique to the destination A may be stored in the numbers list 155. The latter could be, for example, a single value that is equivalent to the summation of the digits of the phone number that identifies the prohibited destination A, and so on. Similarly, a form of identification information for user "B" may be stored in the users list 153. The user identification could be a two-digit number, a set of seven letters, or a combination of numbers and digits.

It should be noted that the identification information that is indicative of a phone number, a class of the phone number and a user might be stored in one list. Therefore, the users list 153, the numbers list 155, and the classes list 158 may be combined into one list that is stored in the verification storage 150. Furthermore, the verification storage 150 may be considered as a one list that contains identification information of users and destinations to be metered which may be implemented internally or externally with respect to the metering circuitry 160.

The structures of the entries within the lists that are stored in the verification storage 150 are shown in FIG. 1A, according to an embodiment of the present invention. Each of the entry structures 191, 192, 193, 194, and 195 includes one or more fields that contain data and information related to the user and the destination to be metered. The first field denoted "Field 1" contains identification information for a destination to be metered. The second field denoted "Field 2" contains the identification information of the user, i.e. the user identification code. The third field denoted "Field 3" contains information concerning a starting and an ending time. Both the start time and the end time are clock times. The latter may be entered either in a military format or in an AM/PM format. For example, Field 3 may contain the code 09001830, wherein the first four digits 0900 refer to the start time (i.e. 9 AM), and the second four digits 1830 refer to the end time (i.e. 6:30 PM), and so on. The third field may be used to determine the time segment which the metering circuitry 160 is set to monitor the usage of the telephone system 100 in regard to the destination identified in Field 1 and/or the user identified in Field 2.

Accordingly, if an outgoing phone number (for a destination that is identified in Field 1) is dialed from the telephone system 100 by a user that is identified in Field 2 within an entry that is stored in the verification storage 150, the outgoing call will be metered if the time the call is placed is within the limits identified in Field 3 of that entry. The fourth field denoted "Field 4" contains information that is indicative of the overall (total) time allowed for the specific destination and the specific user. This field has information that specifies the total quantity of time in days, hours, or minutes. For example, Field 4 may contain a code in a format such as NNL, wherein the first two digits (NN) refer to a number, such as 12, and third digit (L) refers to the time unit of the numeric NN, such as D, H, or M. For example, a code 12H may be used to specify the overall time as 12 hours, a code 30M may be used to specify the overall time as 30 minutes, and so on. It should be noted that the above examples are given for the purpose of illustration and are not intended to restrict the scope of the present invention to the described specifics. Any combinations of characters and/or formats that may be used to implement the fields of the entries described above are therefore contemplated by the present invention.

In the embodiment shown in FIG. 1A, the structures 191, 192, 193, and 194 include the Fields (1), (1 & 2), (1, 2 & 3), and (1, 2, 3, & 4), respectively. The structure 195 includes the Fields 2 and 4. When an outgoing call is placed through the keypad entry device 110, the user may dial the destination phone number. The dialing signal is received by the control unit 166 of the metering circuitry 160 prior to transferring the call to the telephone processing circuitry 140. The former is configured to encode the dialing signal using the codec unit 168 and to compare the encoded outgoing phone number with one of the entries which has a structure 191, 192, 193, or 194.

If the entry structure is 192, 193, or 194, the control unit is configured to request a user identification code through an announcement that is generated by an announcement unit 170 (FIG. 1) within the telephone system 100. The user must then enter his identification code. The control unit 166 uses (or encodes) the received user identification code and compares it with Field 2 of the identified entry (192, 193, or 194). The control unit 166 activates the metering unit 167 upon the processing of the outgoing phone number and the user identification code. Next, if the entry structure is 193 or 194, the metering unit 167 is configured to compare the information stored within Field 3 (start and end times) of the entry, with the current time that is obtained from the clock 169.

If the current time is within the time limits stored in Field 3, and the entry structure is 194, the metering unit 167 is configured to obtain the value (total time) that is stored in Field 4. If the total time value is greater than 0, the metering unit 167 simultaneously activates its timer and sends a signal to the control unit 166. The control unit 166 then permits the outgoing call to progress while the metering unit 167 measures the time of the outgoing call. At the conclusion of the call, the time spent on the call (that is measured by the metering unit 167) is subtracted from the value of the total time in Field 4 (which was obtained prior to allowing the call to progress) and a new value is stored in Field 4. The new value is equal to the difference between the total time obtained prior to the call and the time measured during the call. Accordingly, Field 4 is updated with every call and, thus it becomes progressively less every time the call is made. When the total time allowed (the value in Field 4) reaches zero, the access to the outgoing call is denied and, therefore, the user can not place the call.

Accordingly, when the entry structure is 194, the owner of the telephone system 100 has a control over both the total time allowed for an outgoing call and the time of the day when the outgoing call is to be placed or attempted per a specific destination per a specific user. This control, which is associated with the entry structure 194, may be represented by a code (C-194) that is written as a function (F) of the variables upon which the control is exercised, as:

C-194=F (destination, user, time of the call, time on the phone)

Upon encoding the outgoing phone number, if the control unit 166 identifies an entry structure 193, which contains the outgoing destination (Field 1), a request to obtain the user identification code is made. The control unit 166 then compares the received user identification code with Field 2 of the identified entry, and activates the metering unit 167. The metering unit 167 compares the information stored within Field 3 of the identified entry, with the current time that is obtained from the clock 169. If the current time is within the time limits stored in Field 3, the metering unit 167 is configured to send a signal into the control unit 166. The latter permits the outgoing call to progress. Accordingly, when the entry structure is 193, the owner of the telephone system 100 has a control over both the time of the day when the outgoing call is placed or attempted per a specific destination per a specific user, thus this control may be expressed as:

C-193=F (destination, user, time of the call)

The entry structure 195 contains Field 2 and Field 4. Therefore, it may be used to relate the user to the total time allowed for the telephone usage of that user, independent from the outgoing destinations. For example, if the owner prefers to restrict the total telephone time for his child, such that the child may freely call destinations but he can do so only for an hour per week, the entry structure 195 may be used. In this case, the control unit 166 receives the outgoing phone number that is dialed through the keypad entry device 110, and compares the encoded number with the entries stored in the verification storage 150. Since none of the structures 191–194 will be identified, the control unit 166 will immediately request the identification code of the user. The control unit 166 receives the user identification code and compares it with Field 2 of the entries stored with the structure 195. The control unit 166 activates the metering unit 167 upon the receiving the user identification code when the specific entry that identifies the user is obtained. The metering unit 167 obtains the value (total time) that is stored in Field 4 of the specified entry. If the total time value is greater than 0, the metering unit 167 simultaneously activates its timer and sends a signal to the control unit 166. The control unit 166 then permits the outgoing call to progress while the metering unit 167 measures the time of the outgoing call. At the conclusion of the call, the time spend as measured by the metering unit 167 is subtracted from the value of the total time in Field 4 and the new value of the total time is stored in Field 4 of the specified entry. Accordingly, when the entry structure is 195, the owner of the telephone system 100 has a control over the total time of telephone usage for outgoing calls per a specific user independent from the destinations. This control may be expressed as:

C-195=F (user, time on the phone)

In one embodiment, the entry structure 195 may be used in conjunction with the structures 192 and 191. The case of using the entry structure 195 coupled with the entry structure 192 is discussed first. In such a case, the control unit 166 receives the outgoing phone number and compares the encoded number with the entries stored within the verification storage 150. If one or more of the 192 entries, which contain Field 1, that corresponds to the encoded number is identified, the control unit 166 requests the user identification code. The latter is compared with the stored entries and due to a match with Field 2, the specific entry for the dialed destination and the user is identified. Since the identified entry of the structure 192, the control unit 166 is configured to identify a second entry of the structure 195 that corresponds to the identified 192 structure (both will have the same Field 2). The control unit 166 activates the metering unit 167 when the set 192–195 is obtained. The metering unit 167 obtains the value (total time) that is stored in Field 4 of the identified 195 entry. If the total time value is greater than 0, the metering unit 167 simultaneously activates its timer and sends a signal to the control unit 166. The control unit 166 then permits the outgoing call to progress while the metering unit 167 measures the time of the outgoing call. At the conclusion of the call, the call time measured by the metering unit 167 is subtracted from the value of the total time in Field 4 in the 195 structure entry and the new value of the total time is stored in Field 4 of this entry. Accordingly, the owner of the telephone system 100 has a control over the time spend by a user for a specific distention. This control may be expressed as:

C-192/195=F (destination, user, time on the phone)

The entry structure 195 may be also coupled with the entry structure 191 for the general purpose of monitoring the usage of the telephone system 100. The entry structure 195 is created when the entry structure 191 is identified. Accordingly, outgoing destinations may be identified and stored independently from the users, since the entry structure 191 contains only Field 1. In this case, the owner prefers that the identified destination in Field 1 to be monitored independent from who may be calling the identified destination. The control unit 166 receives the outgoing phone number that is dialed through the keypad entry device 110, and compares the encoded number with the entries stored in the verification storage 150. Since the encoded number can be identified in one of the entries that has a structure 191, the control unit 166 may or may not request the identification code of the user, depending on predetermined criteria. These two cases will be addressed in the following two particular embodiments.

In a first particular embodiment, the control unit is configured to request the user identification. In this embodiment the identified structure 191 is attached to a created structure 195. The requested identification code is used only for the attachment purpose but it does not provide a value upon which access is determined. When the control unit receives the user identification code, it updates Field 2 in the entry 195 (which up to this minute is empty), and it places a default value of a total time in Field 4 based on the predetermined criteria. The combined structures 191/195 contain Fields 1, 2, and 4, however, Field 2 is not active (i.e., it is used only for the purpose of the attachment). The control unit 166 activates the metering unit 167 upon creating the combined 191/195 structures. The metering unit 167 obtains the default total time value that was stored in Field 4 of the combined entry. If the total time value is greater than 0, the metering unit 167 simultaneously activates its timer and sends a signal to the control unit 166. The control unit 166 then permits the outgoing call to progress while the metering unit 167 measures the time of the outgoing call. At the conclusion of the call, the call time measured by the metering unit 167 is subtracted from the value of the total time in Field 4 and the new value of the total time is stored in Field 4 of the combined 191/195 entry. Although the user identification code is required, no actual monitoring on the user is performed; i.e. the value of Field 2 is replaced every time a different user calls the identified destination. However, the user who will be allowed calling the specific destination must have a user identification code. Further, it is possible to identify the last user who called the identified destination since Field 2 contains the value of the most recent user identification code. Accordingly, the owner is able to control the collective time spent on a specific destination independent from the user (with the condition that the user has an identification code to access the specific destination). This control may be expressed as:

C-191/195 [user]=F (destination, [user], time on the phone)

In a second particular embodiment, the control unit 166 is configured not to request the user identification code. In this embodiment the identified structure 191 is attached to the created structure 195. Once the structures 191 and 195 are combined, Field 2 within the structure 195 is filled with a special value that indicates to the control unit 166 a no need to obtain the user identification code when the specific destination is dialed. When the combined 191/195 structure is generated, the control unit 166 places a default value of a total time in Field 4 based on the predetermined criteria. The combined structure 191/195 effectively contains Fields 1, 2, and 4; however, Field 2 has a constant value. The control unit 166 activates the metering unit 167 upon creating the combined 191/195 structure. The metering unit 167 obtains the default total time value that was stored in Field 4 of the combined entry. If the total time value is greater than 0, the metering unit 167 simultaneously activates its timer and sends a signal to the control unit 166. The control unit 166 then permits the outgoing call to progress while the metering unit 167 measures the time of the outgoing call. At the conclusion of the call, the call time measured by the metering unit 167 is subtracted from the value of the total time in Field 4 and the new value of the total time left is stored in Field 4 of the combined entry. Accordingly, the owner is able to control the collective time spent on a specific destination independent from the users. This control may be expressed as:

C-191/195=F (destination, time on the phone)

Returning now to FIG. 1 as discussed earlier the keypad entry device 110 is coupled to the metering circuitry 160. In one embodiment, the keypad entry device 110 facilitates the initiation of an outgoing call by entering a series of touch-tone signals that correspond to the outgoing call destination. The series of the touch-tone signals (or the dialing signal) is routed and received by the metering circuitry 160 prior to routing the dialing signal to the telephone processing circuitry 140. Accordingly, the dialing signal that requests an outgoing call has to pass an "examination" that is performed by the metering circuitry 160 for the outgoing call to proceed. The dialing signal may be converted into a more appropriate code (for processing), or encoded by the codec unit 168. The generated code may be the encoded phone number as a whole or it may be a specific part of encoded phone number. The generated code, that is indicative of the outgoing phone call, is then compared with the content stored within the verification storage 150. The control unit 166 directs the comparison (and the necessary signals for the comparison process) following predetermined criteria. The latter may be implemented by executing software within the telephone system 100, or an external device such as a computer.

In one embodiment, the control unit 166 may be configured to produce an announcement that is addressed to the user of the telephone system 100, such that the announcement informs the user that he may not call, or should not call, the destination he just dialed, the reason for denying him access, and so on. The announcement unit 170 may generate the announcement, and it may broadcast it on the speaker 130. Alternatively, the announcement is broadcast to a speaker other than the speaker 130. The announcement unit 170 generates voice messages and broadcasts the messages to the user upon receiving control signals from the control unit 166. The owner of the telephone system 100 may pre-record the outgoing voice message announcements (to be provided by the announcement unit 170). For example, a homeowner may select a message such as "Sorry! your access is denied because . . . .".

In one embodiment, at least one announcement message is stored in the announcement unit 170. Different announcements may be generated and broadcast to the speaker 130 based on the result of the comparison between the encoded outgoing phone number (and/or the user identification code) and the structure and the content of at least one of the entries that is stored in the verification storage 150. Accordingly, different announcements may be broadcast for different dialed numbers or classes of the dialed numbers. For example, if the dialed number is for a long distance destination that was selected by a parent as a prohibited number so that a child may not dial it, the announcement unit 170 may broadcast "You have been told not to call this number!". If the dialed destination is within a class of numbers, such as the 900 numbers, the announcement unit 170 may broadcast "You do not have access to dial a 900 destination!", or "Your time has expired, check with your mother!", and so on. Furthermore, the control unit 166 may log the number of "dialing violations" of a specific destination. The number of dialing attempts per specific destination may be used as input for a predetermined criterion (which is employed by the control unit 166) to select which announcement to be broadcast. Accordingly, the announcement unit 170 may broadcast two different announcements for the dialing of the same destination. It should be noted that the announcement length and content might vary depending on the owner's preference and the intended use of the telephone system 100.

In the embodiment of FIG. 1, the telephone system 100 uses a delay unit 180 that is coupled between the metering circuitry 160 and the telephone processing circuitry 140. Generally speaking, the metering circuitry 160 is configured to send a deactivation signal to the telephone processing circuitry 140 upon detecting a condition that causes the metering unit 160 to exercise a control over the dialed destination, such as a denial of the user's access to complete the outgoing call. The deactivation signal resets the telephone system 100. In one particular embodiment, the delay unit 180 may be used to delay the deactivation signal (thus delaying the rest of the telephone system 100) until the announcement that is broadcast by the announcement unit 170 is completed. In this embodiment, the announcement control signal, which is generated by the control unit 166 (upon detecting a prohibited phone number), sets the delay unit 180.

The setting of the delay unit 180 is dependent on the content carried by the announcement control signal that is received from the control unit 166. Accordingly, different time delays may be set based on the length of the specific announcement to be broadcast by the announcement unit 170. Alternatively, the delay unit 180 may be included within the announcement unit 170 or the metering circuitry 160. It should be noted that different configurations are possible with regard to implementing the reset signal. For example, the reset signal may be sent after a fixed time period that is measured from the start of the announcement, or the reset signal is generated upon detecting a special code that may be inserted at the end of each announcement message.

As discussed above, an entry within the verification storage 150 may be the same dialing representation of the corresponding phone number, the class of the phone number, or the user identification code (that is dialed by the keypad entry device 110). In this case, the use of the codec unit 168 may be limited or eliminated. However, for the purpose of minimization storage size, encoding the dialed numbers may be preferred. The encoded number is then compared with encoded entries in the lists. The encoded entries are stored upon encoding the dialed signals that are entered by the owner of the telephone system 100. If the encoding option is used, the dialed phone number is decoded back to its origin by the codec unit 168 after the completion of the comparison process, which is directed by the control unit 166 in the metering circuitry 160. If the result of the comparison indicates that the user has an access to the dialed number, the decoded signal is then transmitted from the metering circuitry 160 into the telephone processing circuitry 140, and the outgoing call proceeds normally.

In one particular embodiment, the decoding of the encoded phone number by the codec unit 168 is eliminated by the use of the memory 164. In this embodiment, the metering circuitry 160 is configured to store a copy of the dialed phone number in the memory 164. The stored copy is kept in the memory 164 until the verification process is completed. When the control unit 166 determines that the user may call the dialed number (i.e. access is granted), it retrieves the stored copy of the dialed phone number back from the memory 164. Accordingly, the stored copy of the dialed phone number may be directly transmitted from the memory 164 into the telephone processing circuitry 140, thus minimizing the need to decode the encoded phone number, by the codec unit 168, prior to forwarding it into the telephone processing circuitry 140. In this embodiment, the dialed phone number may still be encoded prior to the verification process for the purpose of the verification and to facilitate a smaller verification storage size.

The metering circuitry 160 of the telephone system 100 also includes the access control unit 162. The latter facilitates control over the entry and storage of the information that is stored in the verification storage 150, including phone numbers, classes of phone numbers, and users identification codes. The access control unit 162 employs an access code that is known by the owner of the telephone system 100. The access control unit 162 facilitates the access for the setup and programming of the metering circuitry 160. The access code may be any combination of digits or letters that may be entered by the keypad entry device 110. Accordingly, entering, deleting, and altering entries within the verification storage 150, as well as the functional criteria of the metering circuitry 160, are shielded from users of the telephone system 100, except the owner or other individuals who are authorized by the owner. Furthermore, the access control unit 162 may be also used to enter, delete, change, or select the outgoing messages to be broadcast by the announcement unit 170 upon determining an access control action. For example, to program the metering circuitry 160, the user must enter a password upon which access to the unit is granted.

It should be noted that the access code may be stored in a location within the metering circuitry 160. For example, the access code may be stored within the access control unit 162, the control unit 166, the verification storage 150, or the memory 164. Furthermore, a set of instructions may be stored within the metering circuitry 160 to guide the owner during accessing the metering circuitry 160. The instructions may be provided to the owner, or the authorized user, through voice messages generated by the announcement unit 170 and broadcast to the speaker 130. For example, voice messages that are related to the access control, may include asking the owner to enter the access code, denying access into the metering circuitry, generating the entered phone numbers, the class of the phone numbers, or the users identification codes, and producing the phone numbers, the classes of the phone numbers, and the users' identification codes.

Furthermore, the control unit 166 may be configured to employ a searching routine to obtain and operate upon a specific phone number, specific class in the verification storage 150, or a specific user identification code. It should be noted that different configurations are possible as to the implementation of the different units of the telephone system 100 and the corresponding functions. The above description of specific examples is given for the purpose of illustration and it is not intended to restrict the present invention to the discussed configurations. Therefore, other configurations are contemplated by the present invention.

Figure 2:
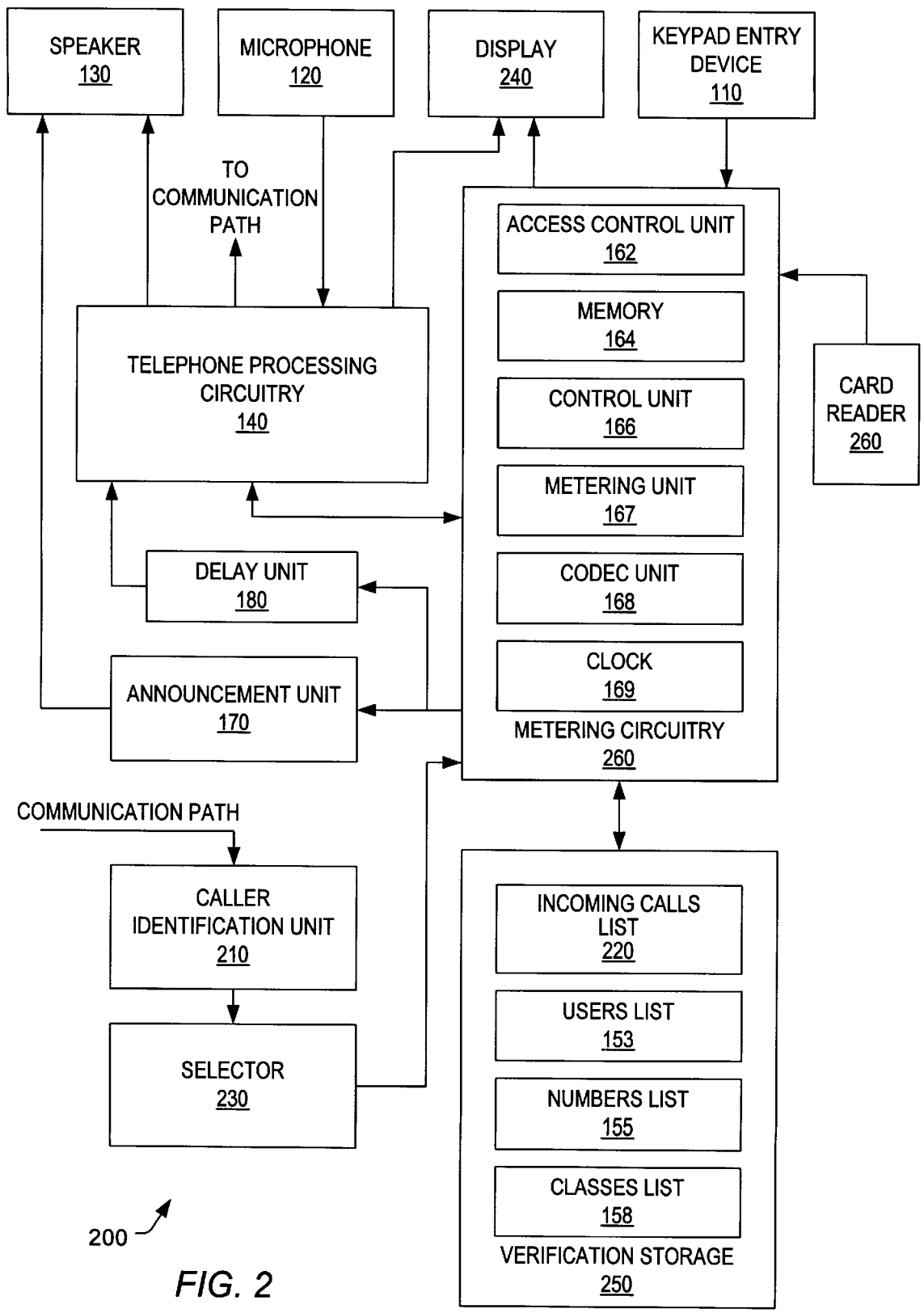
FIG. 2 is a block diagram of a telephone system that enables metering of an individual usage of specific phone numbers and specific classes of phone numbers of outgoing calls with the option to perform the metering function upon incoming calls.

FIG. 2 is a block diagram of a telephone system that enables metering of an individual usage of specific phone numbers and specific classes of phone numbers of outgoing calls with the option to perform the metering function upon incoming calls. The telephone system 200 includes a telephone processing circuitry 140 and a metering circuitry 260. It also includes speaker 130, microphone 120, keypad entry device 110, caller identification unit 210, selector 230, display 240, and a card reader 260. The telephone processing circuitry 140 may include a decoder 141, an encoder 143, a memory 145, an amplifier 147, and a processor 149 as shown in FIG. 1. In general, the telephone processing circuitry 140 and the components 141, 143, 145, 147, and 149 may be similar to those described in the embodiment of FIG. 1. The metering circuitry 260 includes an access control unit 162, a memory 164, a control unit 166, a metering unit 167, a codec unit 168, and a clock 164. The components 162, 164, 166, 167, 168, and 169 may be generally the same as those described in the embodiment of FIG. 1.

The metering circuitry 260 is coupled to verification storage 250. The verification storage 250 includes one or more list. As shown in FIG. 2, the verification storage 250 includes a users list 153, a numbers list 155, a classes list 158, and an incoming calls list 220. The users list 153, numbers list 155, and classes list 158 are similar to those described in the embodiment of FIG. 1. The incoming calls list 220 will be described below. The entries in the four lists included within the verification storage 250 may be stored within one list. Accordingly, the content of the verification storage 250 may be considered as one list. Furthermore, an entry within the users list 153, numbers list 155, and classes list 158 may be any of the structures 191–195 described earlier. The speaker 130, microphone 120, keypad entry device 110, delay unit 180, and announcement unit 170 may be the same as those described in FIG. 1. For simplicity, descriptions of these components are not discussed in the embodiment of FIG. 2.

The telephone system 200 includes the selector 230 and the display 240. The selector 230 is coupled between the caller identification unit 210 and the metering circuitry 260. Alternatively, the selector 230 may be included within the caller identification unit 210 or the metering circuitry 260. Furthermore, the caller identification unit 210 may be included within one of the other units of the telephone system 200, such as the telephone processing circuitry 140. In one embodiment, the selector 230 is used to capture the phone number of a destination where an incoming call was initiated. The capturing of the phone number of the destination station may be achieved during the receiving of the incoming call that is addressed to the telephone system 200. The captured phone number is then processed and stored the incoming calls list 220 within the verification storage 250. The caller identification unit 210 is employed to identify the phone number of the station where the incoming call is initiated. The caller identification unit 210 may be any caller identification device that is capable of at least identifying the phone number of the calling station. Further, the caller identification unit 210 may also identify a name (or other identification data) and other information that are associated with the identified calling station or may be obtained from the incoming signal.

In one particular embodiment, the captured phone number is temporally stored in the memory 164 during the conversation with the caller. Subsequently, the captured phone number may be entered (at a later time) as an entry in the incoming calls list 220 by accessing the metering circuitry 260 through the access control unit 162. Accessing the metering circuitry 260 may be performed as described in the embodiment of FIG. 1. Accordingly, any user of the telephone system 200 may select to capture an incoming call phone number by activating the selector 230, however, only the owner and authorized users have the ability to enter the captured number as a prohibited number in the telephone system 200.

In one embodiment, the metering circuitry 260 employs the entries of the incoming calls list 220 to monitor (and thus meter) the usage of the telephone system 200 during incoming calls. Accordingly, the metering functions may be performed upon both outgoing calls and incoming calls for each user. This option allows the owner of the telephone system 200 to exercise real control over the usage of the telephone. In one case, a child may call a destination, which a time limit on this destination was set by a parent, and asks his friend to call him back, thus avoiding the metering that was intended by the parent. The telephone system 200 enables solutions for such behavior by providing control over the incoming calls, as well as the outgoing calls.

Generally speaking, the phone number of the calling destination may be treated as a phone number of outgoing destination, and stored in Field 1 of the entry structures 191, 192, 193, 194. The incoming phone number of the incoming call may be entered into the entry by the owner of the telephone system using the same procedure of entering an outgoing phone number, as described in the embossments of FIG. 1. Furthermore, the incoming phone number may be captured by the selector 230 during the incoming call (as described above), and then entered by the owner. The metering unit 260 may be set to capture the incoming call phone number using the selector 230. The codec unit 168 may encode the captured phone number. The encoded incoming phone number is provided to the control unit 166 (just like a dialing signal that is received from the keypad entry device 110 for an outgoing phone number). The metering circuitry 160 then performs its functions as described in the embodiments of FIG. 1. For example, the control unit 166 compares the encoded incoming phone number with the entries that are stored within the verification storage 250. If the encoded phone number matches one of the entries (Field 1), the control unit 166 requests a user identification code from the user who answers the incoming phone call, and initiates the metering unit 167 if needed. Accordingly, the usage of the telephone system 200 by a specific user may be metered (following one or more of the controls Cs discussed earlier) during both outgoing and incoming phone calls.

In one particular embodiment, the display 240 is coupled to the telephone processing circuitry 140 and the metering circuitry 260. In general, the display 240 is a read-out device that facilitates displaying of information and data related to the functions and operation of the telephone system 200. For example, the display 240 may provide information related to the incoming calls that are received by the telephone system 200 and the outgoing calls that are dialed (or transmitted) by the telephone system 200. Furthermore, the display 240 may be configured to provide information related to the verification functions of the metering circuitry 260. For example, the display 240 may be adapted to display the announcements that are broadcast when the metering unit denies an access for a specific user, the time left for the specific user to initiate calls or receive calls collectively or for a specific destinations, status of the verification storage 250, programming instructions, usage reports, and access codes and instructions for entering, deleting, and altering entries in the verification storage 250.

In one particular embodiment, the user identification code may be entered by the card reader 260. The latter is a device that may be adapted to read a code that is stored in a card. Each of the users of the telephone system 200 receives a card that contains at least the user identification code. The card may also include other information related to the user or the telephone system 200. For example, the card may include information about the total time assigned to the user collectively for using the telephone system 200 and/or for specific destinations. The metering circuitry 260 may be configured to decode the information retrieved from the card using the codec unit 168 and to encode such information into the verification storage 260. In general, the card reader replaces the entry of the user identification code through the keypad entry device. Preferably, the card reader is configured to read magnetically coded information on a card that carries a magnetic storage medium, or strip. The user may use the card reader 260 by sliding his card through, (placing the card on/in) the card reader 260. Furthermore, the card reader 260 may be used to store and update information that is stored in the card. Alternatively, the card may be updated or activated by an external device configured to store information on the card.

Figure 3:
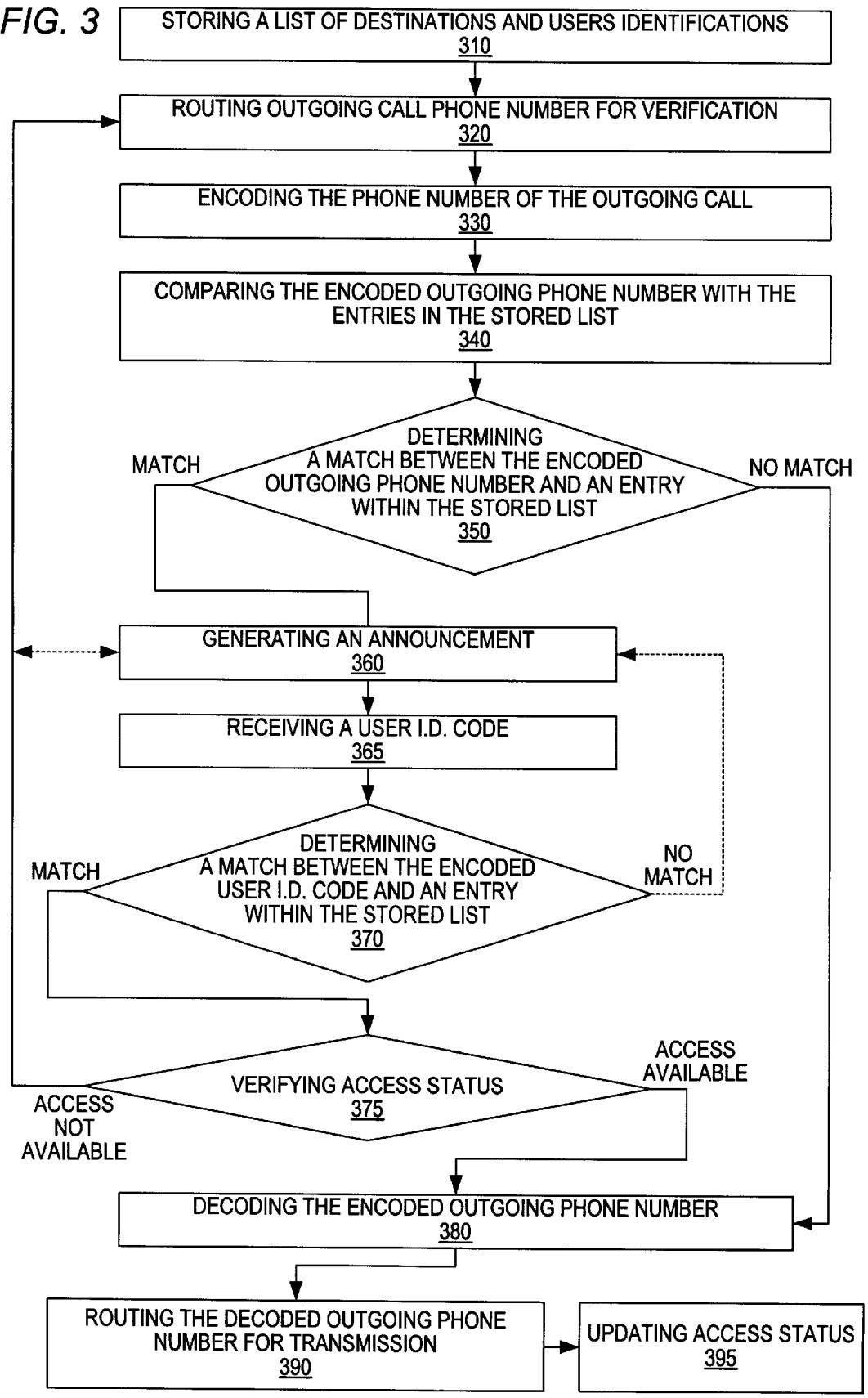
FIGS. 3 is a flow chart of a method that enables metering of an individual usage of specific phone numbers and specific classes of phone numbers of outgoing calls.

Turning now to FIG. 3, a flow chart of a method is shown that enables metering of specific phone numbers and specific classes of phone numbers of outgoing calls for specific users. In step 310, storing of at least one list of phone numbers, classes of phone numbers, and users' identification information is performed. The stored list may contain entries that are indicative of a phone number or a user to be monitored and thus metered. In step 320, an outgoing call (upon dialing its corresponding phone number) is routed from the normal path of transmission. In one embodiment, the routed outgoing call is transferred for an encoding stage. The phone number of the routed outgoing call is then encoded into a code in step 330. In step 340, the encoded outgoing phone number of the outgoing call is compared to the content of the list that is stored in step 310. A determination of the correspondence between the encoded outgoing phone number and at least one entry within the list is made in step 350.

The correspondence includes either a match between the encoded outgoing phone number and at least one entry within the stored list (that is indicative of an outgoing phone number or of its class), or a no match between the encoded outgoing phone number and all the entries within the stored list. If no match is determined in step 350, the encoded outgoing phone number is decoded back to its initial form in step 380. The decoded outgoing phone number is then routed for transmission in step 390; thus the outgoing phone call is permitted. Accordingly, the no match determination in step 350 indicates that the phone number of the outgoing call is not subject for monitoring.

If a match is determined in step 350, an announcement is generated in step 360. The announcement prompts the user to enter his user identification code. The announcement may be a verbal message, a light, or a beep. The entered user identification code is received in step 365 and compared with the stored list in step 370. If a no match is determined in step 370, an announcement (that is addressed to the user) is generated in step 360. In FIG. 3, this action is represented by the dotted line since it is different from the announcement that is generated in response to the match signal that is received from step 350. The announcement may include prompting the user to enter another user identification code or to re-enter his code. If the user fails to provide a user identification code that has a correspondence with one of the entries that is stored in step 310, the access is denied. The last announcement that is generated in step 360 in the case of denying access may be "Sorry, you do not have the appropriate access to this destination!". If a match is determined in step 370, a verification of the access status is performed in step 375. This verification may include verifying the time limits when the outgoing call is permitted for this user, or the total time balance the user may have. The outcome of step 375 determines the status of the access with respect to the user according to predetermined criteria.

If step 375 determines that an access is not available to the user, the outgoing phone call that is routed from step 320 is not permitted, thus the user is denied access to progress with the outgoing call. An announcement to this extent may be generated in step 360 acknowledging the user with his access status. If step 375 determines that an access is available, the encoded outgoing phone number is decoded back to its initial form in step 380. The decoded outgoing phone number is then routed for transmission in step 390; thus the outgoing phone call is permitted. Upon the completion of the outgoing call, the access status is updated in step 395. Updating the access status may include reducing the total time available for this user by an amount that is equivalent to the time he spend on the outgoing call that was permitted.

Figure 4:
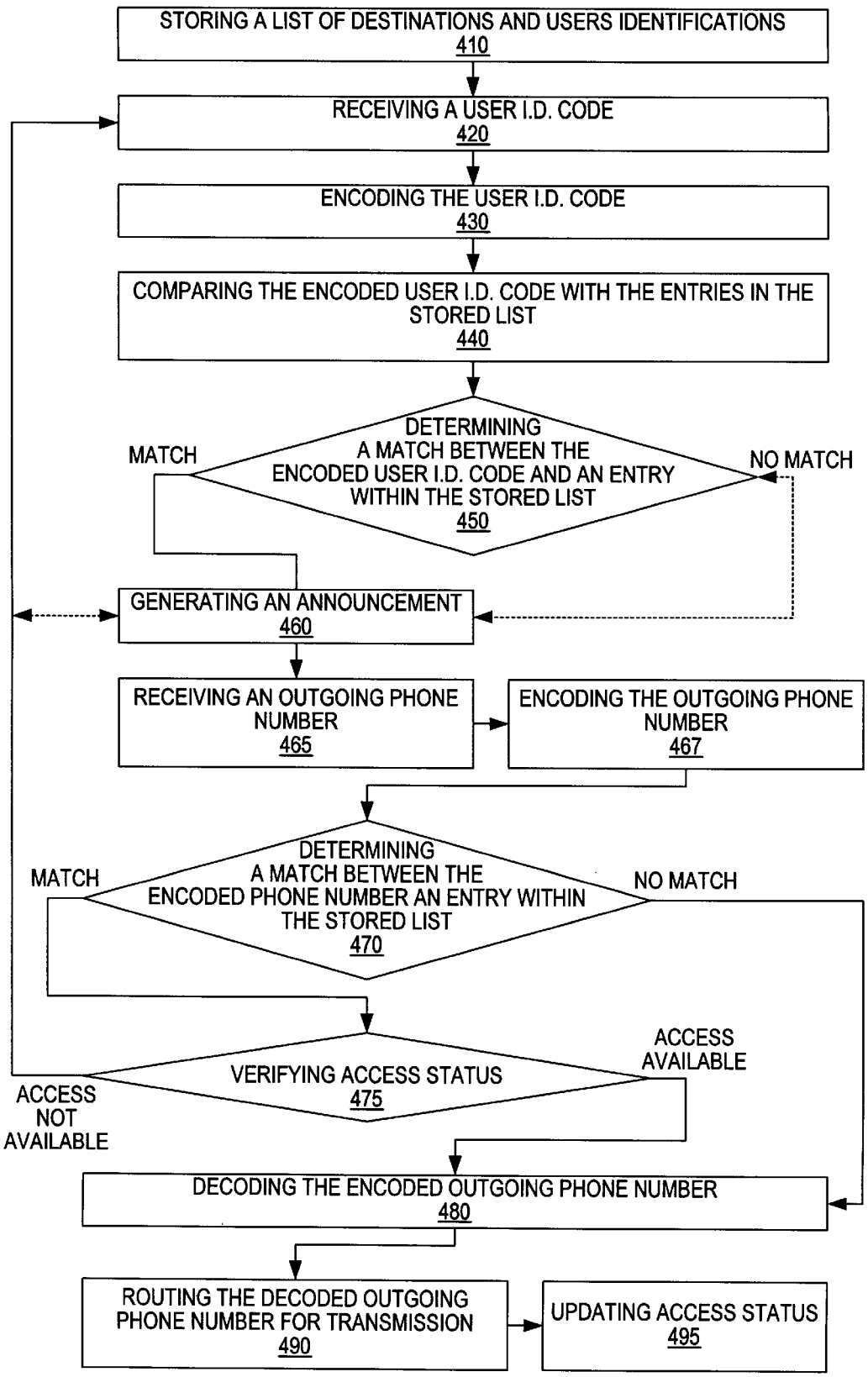
FIGS. 4 is a flow chart of another method that enables metering of an individual usage specific phone numbers and specific classes of phone numbers of outgoing calls.

Turning now to FIG. 4, a flow chart of another method is shown that enables metering of specific phone numbers and specific classes of phone numbers of outgoing calls per specific users. In this embodiment, a user must enter his access identification code prior to entering the phone number of the outgoing call. In this embodiment, step 410 may be the same as in step 310, which is described in FIG. 3. In step 420, the user identification code is received. The user identification code that is received in step 420 may be entered by different means, such as by a dialing pad or by a card reader (such as the one that is described in the embodiment of FIG. 2). Steps 420, 430, 440, and 450 may be similar to steps 320, 330, 340, and 350 of FIG. 3; respectively, except that the user identification code is processed instead of the outgoing phone number. Accordingly, a determination of the correspondence between the encoded user identification code and at least one entry within the list (that is stored in step 410) is obtained in step 450.

The correspondence includes either a match between the user identification code, or the encoded user identification code and at least one entry within the stored list (that is indicative of an a user identification code), or a no match between the encoded user identification code and all the entries within the stored list. If no match is determined in step 450, an announcement is generated in step 460 and no access is granted (dotted line). If a match is obtained in step 450, an announcement is generated in step 460 (solid line) which prompts the user to enter a phone number. The outgoing phone number is received in step 465 and encoded in step 467. The encoded outgoing phone number is then compared with the stored list in step 470. If a no match is determined in step 470, the encoded outgoing phone number is decoded back to its origin in step 480. The phone number is then routed for transmission in step 490. The no match result in step 470 indicates that the user that was identified in step 450 may call the dialed number without restriction. Accordingly, the outgoing call is performed without monitoring or metering.

If a match is determined in step 470, a verification of the access status (of the user) is performed in step 475. The match result of step 470 indicates that the user is not allowed to call the destination he dialed without monitoring or metering. Accordingly, a verification of the access status of the user is performed in step 475. This verification may include verifying the time limits when the outgoing call is permitted for this user, or the total time balance the user has.

The outcome of step 475 determines the status of the access that is available the user according to predetermined criteria. If the outcome of step 475 determines that an access is not available to the user, the outgoing phone call that is received in step 465 is not permitted, thus the user is denied access to progress with the outgoing call. An announcement to this extent may be generated in step 460 acknowledging the user with his access status. If step 475 determines that an access is available, the encoded outgoing phone number is decoded back to its initial form in step 480. The decoded outgoing phone number is then routed for transmission in step 490; thus the outgoing phone call is permitted. Upon the completion of the outgoing call, the access status of the user is updated in step 495.

Turning now to FIG. 5, a flow chart of a method is shown that enables metering of specific phone numbers and specific classes of phone numbers of incoming calls per specific users. In step 510, storing of at least one list of phone numbers, classes of phone numbers, and users identification information is performed. The stored list may contain entries that are indicative of a phone number or a user to be monitored and thus metered. These entries may be the same entries that are stored in step 310 in the embodiment of FIG. 3. In step 520, the phone number of the incoming call is captured. In one embodiment, the captured phone number of the received incoming call is encoded into a code in step 530. In step 540, the encoded incoming phone number of the received call is compared to the content of the list that is stored in step 510. A determination of the correspondence between the encoded incoming phone number and at least one entry within the list is made in step 550.

The correspondence includes either a match between the encoded incoming phone number and at least one entry within the stored list (that is indicative of a phone number or a class of a destination), or a no match between the encoded incoming phone number and all the entries with the stored list. If no match is determined in step 550, the encoded incoming phone number is decoded back to its initial form in step 580. Thus, the decoded phone number is then routed and the incoming phone call is permitted. The steps 520 to 580 as described above may be performed prior to generate the ring signal (sound, light, or readout output). Thus, a user may not notice any operation that is being performed prior to the ring signal. The no match determination in step 550 indicates that the captured phone number of the incoming call is not subject for monitoring.

If a match is determined in step 550, (thus, an indication that the captured phone number of the incoming call is subject for monitoring), any user may answer the incoming call in step 555. In step 560, an announcement (that is addressed to the user) is generated. The announcement may include a voice message, a light, or a beep, that prompts the user to enter his user identification code. For example, the user may input his user identification code either through a keypad entry device (such as the one described in FIG. 1), or through a card reader (such as the one described in FIG. 2). The user identification code is received (and may be encoded) in step 570. If the user fails to provide an acceptable user identification code that has a correspondence with one of the entries that is stored in step 510, a no match determination is obtained in step 565. Accordingly, the user access is denied. However, the user may re-renter his user identification code or another codes (for another user) once or twice in step 565 prior to the termination of the call. This option is represented by the dotted line between steps 570 and 565 FIG. 5. If the access is not granted in a specific time frame after receiving the incoming call, or based on a number of attempts (step 567) according to predetermined criteria, the incoming calls may be transferred to an answering machine.

If a match is determined in step 570, a verification of the access status of the user to receive the incoming call is performed in step 575. This verification may include verifying the total time balance the user has collectively or for the specific captured phone number of the incoming call. The outcome of step 575 determines the status of the access with respect to the user according to predetermined criteria. If an access is not available, an announcement is generated in step 560. Similarly, the incoming call is either optionally answered by another user with prior accesses or is transferred to an answering machine in step 567. The announcement that is generated when the access is not available may inform the user with his access status. If step 575 determines that an access is available, the encoded phone number of the incoming call is decoded back to its initial form and the call is routed for reception in step 580. Thus, the user is permitted to have the incoming call. Upon the completion of the incoming call, the access status of the user is updated in step 590.

While the present invention has been described with reference to particular embodiments, it will be understood that the embodiments are illustrative and that the invention scope is not so limited. Any variations, modifications, additions and improvements to the embodiments described are possible. These variations, modifications, additions and improvements may fall within the scope of the invention as detailed within the following claims.

What is claimed is:

1. A method for managing a user's usage of a telephone system, wherein the telephone system includes a dialer to dial telephone numbers and a transmitter to transmit an outgoing call upon a telephone line, wherein the outgoing call is initiated by the user, the method comprising:

storing a list of one or more registered users;

storing telephone usage information for each of the one or more registered users, wherein the telephone usage information is indicative of permissible telephone usage by that registered user, and wherein the telephone usage information is associated with an identification of that registered user, wherein the telephone usage information includes information indicative of a permissible telephone usage time constraint;

receiving a first series of dialing signals entered by the user; wherein the first series of dialing signals includes call information which includes an identification of the user and an outgoing number;

comparing the call information to the telephone usage information; and denying use of the telephone system to the user if the comparing is indicative of a denial of usage condition, wherein the denial of usage condition is indicated if the user's usage of the telephone system violates the permissible telephone usage time constraint.

2. The method of claim 1, wherein the indentification of the user matches the idenification of one of the one or more registered users;

wherein the permissible telephone usage time constraint comprises a permissible telephone usage time interval, wherein the permissible telephone usage time interval comprises a starting time and an ending time;

wherein the denial of usage condition is indicated if the outgoing call initiated by the user is not initiated during the permissible telephone usage time interval; and wherein the denial of usage condition is indicated if the outgoing call initiated by the user is not completed during the permissible telephone usage interval.

3. The method of claim 2, wherein the telephone usage information further includes information indicative of an outgoing call destination;

wherein the permissible telephone usage time interval is further associated with the outgoing call destination;

wherein the denial of usage condition is indicated if the outgoing call initiated by the user is to the outgoing call destination and is not initiated during the permissible telephone usage time interval; and wherein the denial of usage condition is indicated if the outgoing call initiated by the user is to the outgoing call destination and is not completed during the permissible telephone usage interval.

4. The method of claim 3, wherein the information indicative of an outgoing call destination comprises a plurality of digits that represent at least a portion of the outgoing telephone number, wherein the plurality of digits comprises one of 1) a seven-digit telephone number that does not include digits representing an area code of the outgoing call, 2) a ten-digit telephone number that includes digits representing the area code of the outgoing call, or 3) a specified number of digits that is indicative of a class of the telephone number of the outgoing call, and wherein the class includes a number of digits of the telephone number.

5. The method of claim 1, wherein the denial of usage condition is indicated if the identification of the user does not match the identification of one of the one or more registered users.

6. The method of claim 2, wherein the identification of the user matches the identification of one of the one or more registered users;

wherein the telephone usage information includes information indicative of an outgoing call destination;

wherein the permissible telephone usage time constraint includes a maximum cumulative time of telephone use by the registered user in connection to the outgoing call destination;

wherein the telephone usage information further includes information indicative of a cumulative time of telephone use by the registered user in connection to the outgoing call destination;

wherein the information indicative of a cumulative time of telephone use by the registered user in connection to the outgoing call destination is updated each time the registered user uses the telephone in connection to the outgoing call destination; and wherein the denial of usage condition is indicated if the cumulative time of telephone use by the registered user in connection to the outgoing call destination exceeds the maximum cumulative time of telephone use by the registered user in connection to the outgoing call destination.

7. The method of claim 6, wherein the cumulative time of telephone use by the registered user in connection to the outgoing call destination is reset to zero periodically, thereby providing the cumulative time of telephone use by the registered user in connection to the outgoing call destination for a particular time period; and wherein the maximum cumulative time of telephone use by the registered user in connection to the outgoing call destination comprises a maximum cumulative time of telephone use by the registered user in connection to the outgoing call destination for the particular time period.

8. The method of claim 1, wherein the identification of the user matches the identification of one of the one or more registered users;

wherein the telephone usage information further includes information indicative of a cumulative time of telephone use by the registered user;

wherein the permissible telephone usage time constraint includes a maximum time of telephone use by the registered user;

wherein the information indicative of a cumulative time of telephone use by the registered user is updated each time the registered user uses the telephone; and wherein the denial of usage condition is indicated if the cumulative time of telephone use by the registered user exceeds the maximum time of telephone use by the registered user.

9. The method of claim 8, wherein the cumulative time of telephone use by the registered user is reset to zero periodically, thereby providing the cumulative time of telephone use by the registered user for a particular time period; and wherein the maximum time of telephone use by the registered user comprises a maximum time of telephone use by the registered user for the particular time period.

10. The method of claim 1, wherein the identification of the registered user comprises a user identification code, wherein the user identification code is unique to the registered user, and wherein the user identification code is assigned to the registered user by an owner of the telephone system.

11. A method for managing a user's usage of a telephone system, wherein the telephone system includes a dialer to dial telephone numbers and an incoming call identifier, the method comprising:

storing a list of one or more registered users;

storing telephone usage information for each of the one or more registered users, wherein the telephone usage information is indicative of permissible telephone usage by that registered user, wherein the telephone usage information is associated with an identification of that registered user, and wherein the telephone usage information includes information indicative of a permissible telephone usage time constraint;

receiving an incoming call, wherein a telephone number of the incoming call is stored by the incoming call identifier of the telephone system;

receiving a first series of dialing signals entered by the user wherein the first series of dialing signals includes call information that includes an identification of the user;

comparing the call information to the telephone usage information; and denying use of the telephone system to the user if the comparing is indicative of a denial of usage condition;

wherein the denial of usage condition is indicated if the user's usage of the telephone system violates the permissible telephone usage time constraint.

12. The method of claim 11, wherein the identification of the user matches the identification of one of the one or more registered users;

wherein the permissible telephone usage time constraint comprises a permissible telephone usage time interval, wherein the permissible telephone usage time interval comprises a starting time and an ending time;

wherein the denial of usage condition is indicated if the incoming call is not initiated during the permissible telephone usage time; and wherein the denial of usage condition is indicated if the incoming call is not completed during the permissible telephone usage interval.

13. The method of claim 12, wherein the telephone usage information further includes information indicative of an incoming call source;

wherein the permissible telephone usage time interval is further associated with the incoming call source;

wherein the denial of usage condition is indicated if the incoming call is from the incoming call source and is not initiated during the permissible telephone usage time interval; and wherein the denial of usage condition is indicated if the incoming call is from the incoming call source and is not completed during the permissible telephone usage interval.

14. The method of claim 13, wherein the information indicative of an incoming call source comprises a plurality of digits that represent at least a portion of the outgoing telephone number, wherein the plurality of digits comprises one of 1) a seven-digit telephone number that does not include digits representing an area code of the incoming call, 2) a ten-digit telephone number that includes digits representing the area code of the incoming call, or 3) a specified number of digits that is indicative of a class of the telephone number of the incoming call, and wherein the class includes a number of digits of the telephone number.

15. The method of claim 11, wherein the denial of usage condition is indicated if the identification of the user does not match the identification of one of the one or more registered users.

16. The method of claim 11, wherein the identification of the user matches the identification of one of the one or more registered users;

wherein the telephone usage information includes information indicative of an incoming call source;

wherein the telephone usage information further includes information indicating a cumulative time of telephone use by the registered user in connection to incoming call source;

wherein the permissible telephone usage time constraint includes a maximum cumulative time of telephone use by the registered user in connection to the incoming call source;

wherein the information indicative of a cumulative time of telephone use by the registered user in connection to the incoming call source is updated each time the registered user uses the telephone in connection to the incoming call source; and wherein the denial of usage condition is indicated if the cumulative time of telephone use by the registered user in connection to the incoming call source exceeds the maximum cumulative time of telephone use by the registered user in connection to the incoming call source.

17. The method of claim 16, wherein the cumulative time of telephone use by the registered user in connection to the incoming call source is reset to zero periodically, thereby providing the cumulative time of telephone use by the registered user in connection to the incoming call source for a particular time period; and wherein the maximum time of telephone use by the registered user in connection to the incoming call source comprises a maximum time of telephone use by the registered user in connection to the incoming call source for the particular time period.

18. The method of claim 11, wherein the identification of the user matches the identification of one of the one or more registered users;

wherein the telephone usage information further includes information indicative of a cumulative time of telephone use by the registered user;

wherein the permissible telephone usage time constraint includes a maximum time of telephone use by the registered user;

wherein the information indicative of a cumulative time of telephone use by the registered user is updated each time the registered user uses the telephone; and wherein the denial of usage condition is indicated if the cumulative time of telephone use by the registered user exceeds the maximum time of telephone use by the registered user.

19. The method of claim 18, wherein the cumulative time of telephone use by the registered user is reset to zero periodically, thereby providing the cumulative time of telephone use by the registered user for a particular time period; and wherein the maximum time of telephone use by the registered user comprises a maximum time of telephone use by the registered user for the particular time period.

20. The method of claim 11, wherein the identification of the registered user comprises a user identification code, wherein the user identification code is unique to the registered user, and wherein the user identification code is assigned to the registered user by an owner of the telephone system.

21. A telephone system for managing usage by a user, the system comprising: an entry device configured to dial a telephone number for an outgoing call;

a transmitter configured to transmit the outgoing call; and a metering unit coupled to the entry device and the transmitter, wherein the metering unit is configured to:

store a list of one or more registered users;

store telephone usage information for each of the one or more registered users, wherein the telephone usage information is indicative of permissible telephone usage by that registered user, and wherein the telephone usage information is associated with an identification of that registered user, and wherein the telephone usage information includes information indicative of a permissible telephone usage time constraint;

receive a first series of dialing signals entered by the user; wherein the first series of dialing signals includes call information, which includes an identification of the user and an outgoing number;

compare the call information to the telephone usage information; and deny use of the telephone system to the user if the comparing is indicative of a denial of usage condition;

wherein the denial of usage condition is indicated if the user's usage of the telephone system violates the permissible telephone usage time constraint.

22. The telephone system of claim 21,
wherein the identification of the user matches the identification of one of the one or more registered users;
wherein the permissible telephone usage time constraint comprises a permissible telephone usage time interval, wherein the permissible telephone usage time interval comprises a starting time and an ending time;
wherein the denial of usage condition is indicated if the outgoing call is not initiated during the permissible telephone usage time; and
wherein the denial of usage condition is indicated if the outgoing call is not completed during the permissible telephone usage interval.

23. The telephone system of claim 22,
wherein the telephone usage information further includes information indicative of an outgoing call destination;
wherein the permissible telephone usage time interval is further associated with the outgoing call destination;
wherein the denial of usage condition is indicated if the outgoing call is to the outgoing call destination and is not initiated during the permissible telephone usage time interval; and
wherein the denial of usage condition is indicated if the outgoing call is to the outgoing call destination and is not completed during the permissible telephone usage time interval.

24. The telephone system of claim 23, wherein the information indicative of an outgoing call destination comprises a plurality of digits that represent at least a portion of the outgoing telephone number, wherein the plurality of digits comprises one of 1) a seven-digit telephone number that does not include digits representing an area code of the outgoing call, 2) a ten-digit telephone number that includes digits representing the area code of the outgoing call, or 3) a specified number of digits that is indicative of a class of the telephone number of the outgoing call, and wherein the class includes a number of digits of the telephone number.

25. The telephone system of claim 21, wherein the denial of usage condition is indicated if the identification of the user does not match the identification of one of the one or more registered users.

26. The telephone system of claim 21,
wherein the identification of the user matches the identification of one of the one or more registered users;
wherein the telephone usage information includes information indicative of an outgoing call destination;
wherein the telephone usage information further includes information indicating a cumulative time of telephone use by the registered user in connection to the outgoing call destination;
wherein the permissible telephone usage information includes a maximum cumulative time of telephone use by the registered user in connection to the outgoing call destination;
wherein the information indicative of a cumulative time of telephone use by the registered user in connection to the outgoing call destination is updated each time the registered user uses the telephone in connection to the outgoing call destination; and
wherein the denial of usage condition is indicated if the cumulative time of telephone use by the registered user in connection to the outgoing call destination exceeds the maximum cumulative time of telephone use by the registered user in connection to the outgoing call destination.

27. The telephone system of claim 26,
wherein the cumulative time of telephone use by the registered user in connection to the outgoing call destination is reset to zero periodically, thereby providing the cumulative time of telephone use by the registered user in connection to the outgoing call destination for a particular time period; and
wherein the maximum time of telephone use by the registered user in connection to the outgoing call destination comprises a maximum time of telephone use by the registered user in connection to the outgoing call destination for the particular time period.

28. The telephone system of claim 21,
wherein the identification of the user matches the identification of one of the one or more registered users;
wherein the telephone usage information further includes information indicative of a cumulative time of telephone use by the registered user;
wherein the permissible telephone usage time constraint includes a maximum time of telephone use by the registered user;
wherein the information indicative of a cumulative time of telephone use by the registered user is updated each time the registered user uses the telephone; and
wherein the denial of usage condition is indicated if the cumulative time of telephone use by the registered user exceeds the maximum time of telephone use by the registered user.

29. The telephone system of claim 28,
wherein the cumulative time of telephone use by the registered user is reset to zero periodically, thereby providing the cumulative time of telephone use by the registered user for a particular time period; and
wherein the maximum time of telephone use by the registered user comprises a maximum time of telephone use by the registered user for the particular time period.

30. The telephone system of claim 21, wherein the identification of the registered user comprises a user identification code, wherein the user identification code is unique to the registered user, and wherein the user identification code is assigned to the registered user by an owner of the telephone system.

31. The telephone system of claim 21, further comprising:
an access control unit configured to enable storing telephone usage information using an access code that is known by an owner of the telephone system, and wherein the access code includes a series of digits;
an announcement generator configured to broadcast at least one of a plurality of announcements, wherein one or more of the plurality of announcements are adapted to provide instructions for entering, deleting, and updating the entries through the access control unit, to provide status information when access to the access control unit is denied, and to provide requests generated by the metering unit to the user; and
a display unit that is configured to display the instructions, the status information, and data related to outgoing telephone calls and incoming telephone calls.

32. A telephone system for managing usage by user, the system comprising:
an entry device configured to dial a number;

a receiver configured to receive an incoming call;

an incoming call identifier; and a metering unit coupled to the entry device, the receiver, and the incoming call identifier, wherein the metering unit is configured to:

store a list of one or more registered users;

store telephone usage information for each of the one or more registered users, wherein the telephone usage information is indicative of permissible telephone usage by that registered user, and wherein the telephone usage information is associated with an identification of that registered user, and wherein the telephone usage information includes information indicative of a permissible telephone usage time constraint;

store a telephone number of the incoming call which is identified by the incoming call identifier of the telephone system;

receive a first series of dialing signals entered by the user wherein the first series of dialing signals includes call information that includes an identification of the user;

compare the call information to the telephone usage information; and deny use of the telephone system to the user if the comparing is indicative of a denial of usage condition;

wherein the denial of usage condition is indicated if the user's usage of the telephone system violates the permissible telephone usage time constraint.

33. The telephone system of claim 32, wherein the identification of the user matches the identification of one of the one or more registered users;

wherein the permissible telephone usage time constraint comprises a permissible telephone usage time interval, wherein the permissible telephone usage time interval comprises a starting time and an ending time;

wherein the denial of usage condition is indicated if the incoming is not initiated during the permissible telephone usage time interval; and wherein the denial of usage condition is indicated if the incoming call is not completed during the permissible telephone usage interval.

34. The telephone system of claim 33, wherein the telephone usage information further includes information indicative of an incoming call source;

wherein the permissible telephone usage time interval is further associated with the incoming call source;

wherein the denial of usage condition is indicated if the incoming call is from the incoming call source and is not initiated during the permissible telephone usage time interval; and wherein the denial of usage condition is indicated if the incoming call is from the incoming call source and is not completed during the permissible telephone usage interval.

35. The telephone system of claim 34, wherein the information indicative of an incoming call source comprises a plurality of digits that represent at least a portion of the incoming telephone number, wherein the plurality of digits comprises one of 1) a seven-digit telephone number that does not include digits representing an area code of the incoming call, 2) a ten-digit telephone number that includes digits representing the area code of the incoming call, or 3) a specified number of digits that is indicative of a class of the telephone number of the incoming call, and wherein the class includes a number of digits of the telephone number.

36. The telephone system of claim 32, wherein the denial of usage condition is indicated if the identification of the user does not match the identification of one of the one or more registered users.

37. The telephone system of claim 32, wherein the identification of the user matches the identification of one of the one or more registered users;

wherein the telephone usage information includes information indicative of an incoming call source;

wherein the telephone usage information further includes information indicating a cumulative time of telephone use by the registered user in connection to the incoming call source;

wherein the permissible telephone usage time constraint comprises a maximum cumulative time of telephone use by the registered user in connection to the incoming call source;

wherein the information indicative of a cumulative time of telephone use by the registered user in connection to the incoming call source is updated each time the registered user uses the telephone in connection to the incoming call source; and wherein the denial of usage condition is indicated if the cumulative time of telephone use by the registered user in connection to the incoming call source exceeds the maximum cumulative time of telephone use by the registered user in connection to the incoming call source.

38. The telephone system of claim 37, wherein the cumulative time of telephone use by the registered user in connection to the incoming call source is reset to zero periodically, thereby providing the cumulative time of telephone use by the registered user in connection to the incoming call source for a particular time period; and wherein the maximum time of telephone use by the registered user in connection to the incoming call source comprises a maximum time of telephone use by the registered user in connection to the incoming call source for the particular time period.

39. The telephone system of claim 32, wherein the identification of the user matches the identification of one of the one or more registered users;

wherein the telephone usage information further includes information indicative of a cumulative time of telephone use by the registered user;

wherein the permissible telephone usage time constraint includes a maximum time of telephone use by the registered user;

wherein the information indicative of a cumulative time of telephone use by the registered user is updated each time the registered user uses the telephone; and wherein the denial of usage condition is indicated if the cumulative time of telephone use by the registered user exceeds the maximum time of telephone use by the registered user.

40. The telephone system of claim 39, wherein the cumulative time of telephone use by the registered user is reset to zero periodically, thereby providing the cumulative time of telephone use by the registered user for a particular time period; and wherein the maximum time of telephone use by the registered user comprises a maximum time of telephone use by the registered user for the particular time period.

41. The telephone system of claim 32, wherein the identification of the registered user comprises a user identification code, wherein the user identification code is unique to the registered user, and wherein the user identification code is assigned to the registered user by an owner of the telephone system.

42. The telephone system of claim 41, further including a card reader that is configured to read a card that is assigned to the user, wherein the card reader is adapted to enter the user identification code of the user, and wherein an output of the card reader is received by the metering unit upon a request for the user identification code by the metering unit.

43. The telephone system of claim 32, further comprising:

an access control unit configured to enable storing of entries in the list using an access code that is known by an owner of the telephone system, and wherein the access code includes a series of digits, an announcement generator configured to broadcast at least one of a plurality of announcement, wherein one or more of the plurality of announcements are adapted to provide instructions for entering, deleting, and updating the entries through the access control unit and status information when the access is denied, and to provide requests generated by the metering unit to the user;

a display unit that is configured to display the instruction, the status information, and data related to outgoing telephone calls, and incoming telephone calls; and a selector unit that is configured to capture the telephone number of the incoming call that is received by the telephone system.

* * * * *

UNITED STATES PATENT AND TRADEMARK OFFICE
CERTIFICATE OF CORRECTION

PATENT NO.    : 6,246,756 B1                                    Page 1 of 1
DATED         : June 12, 2001
INVENTOR(S)   : Borland et al.

It is certified that error appears in the above-identified patent and that said Letters Patent is hereby corrected as shown below:

<u>Column 19, claim 6,</u>
Line 33, please delete "claim 2" and substitute -- claim 1 --.

<u>Column 25, claim 32,</u>
Line 20, please insert a comma between "user" and "wherein".

Signed and Sealed this

Fifth Day of February, 2002

Attest:

JAMES E. ROGAN
Attesting Officer  *Director of the United States Patent and Trademark Office*